Patented May 23, 1933

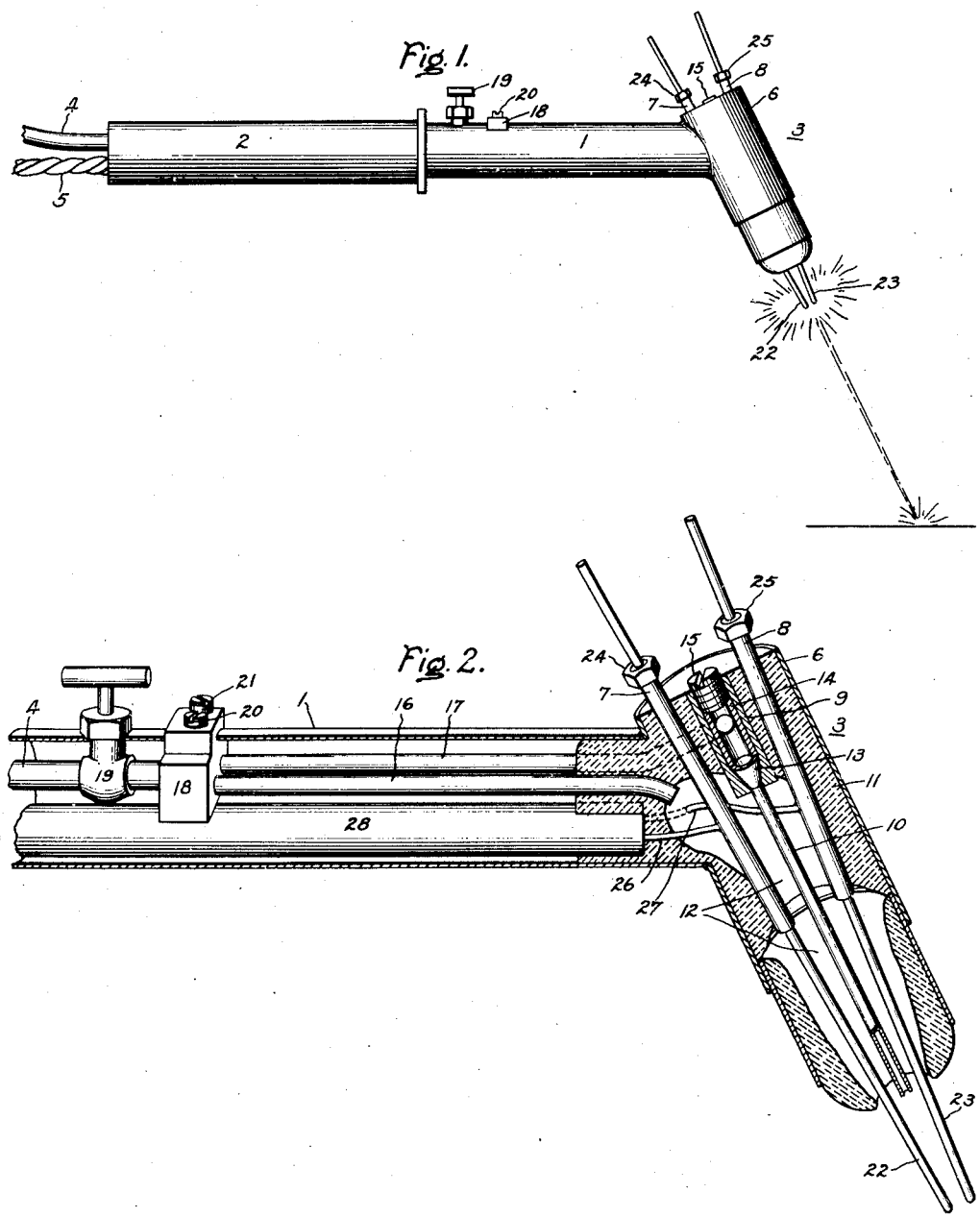

1,911,033

UNITED STATES PATENT OFFICE

BORIS VASLEY NAGASHEV, OF LYNN, MASSACHUSETTS, ASSIGNOR TO GENERAL ELECTRIC COMPANY, A CORPORATION OF NEW YORK

ATOMIC GAS TORCH

Application filed August 25, 1930. Serial No. 477,508.

My invention relates to atomic gas torches, and particularly to torches of the gas-arc type adapted for cutting, welding, spraying metals, or for other metallurgical operations.

My invention is particularly applicable to the utilization of the heating effect of flames of atomic hydrogen. Utilization of such atomic hydrogen flames is disclosed and claimed broadly in the copending application of Irving Langmuir, Serial No. 729,185, filed July 30, 1924, for Heating process and apparatus, which application is assigned to the same assignee as the present application. As disclosed in that application a flame of atomic gas is produced by supplying a molecular gas to an arc where it is dissociated and conveying the dissociation products, i. e. atomic gas, from the arc to the place where it is to be utilized as a heating medium. In one particular embodiment described in that case a jet of gas is directed across the arc to carry the atomic gas generated in the presence of the arc to the object to be heated.

I have found that a blast of a large amount of hydrogen will cool off the atomic gas so appreciably that it will recombine into its molecular state at a comparatively short distance from the arc core. If in place of a tube of appreciable cross-section a capillary tube or tube of small bore be employed and gas supplied through this tube under substantial pressure, the gas issuing from the tube will have sufficient velocity to draw the atomic gases about the arc into a narrow pencil, and the amount of gas used in the jet will be so small that it will not appreciably cool off the arc core or the gases surrounding it. Since the temperature of the gases is not appreciably lowered by this latter procedure the atomic gas does not recombine into its molecular state for an appreciable interval of time. Consequently, by employing capillary tubes or tubes of small bore for discharging a fine jet of high velocity gas across the arc, it is possible to produce a long flame of atomic gas.

It is an object of my invention to provide a torch in which a tube of small bore is used for directing a fine jet of high velocity gas across the arcing terminals of electrodes about which atomic gas is generated.

It is a further object of my invention to provide in a gas-arc torch means for drawing the atomic gas generated about the arc into a long, narrow, concentrated stream suitable for performing heating operations at substantial distances from the torch.

My invention will be better understood from the following description taken in connection with the accompanying drawing and its scope will be pointed out in the appended claims.

In the drawing Fig. 1 is a side view of one embodiment of my improved torch in which the nature and length of the atomic gas flame has been indicated, and Fig. 2 is a sectional view of the head of the torch shown in Fig. 1 showing the construction and arrangement of the parts thereof.

The torch shown in Fig. 1 comprises a stock 1 provided at its left end with a handle 2 and at its right end with a head member 3 constituting the nozzle of the torch. Gas is supplied to the torch through a conduit 4 and electricity, through conductors 5.

The head 3 of the torch comprises, as shown in Fig. 2, a hollow member 6 enclosing a plurality of electrode holders 7 and 8, a bushing 9, and a tube 10. The electrode holders 7 and 8 and bushing 9 are held in place within the hollow member 6 by means of a refractory, insulating cement 11, the arrangement of parts being such that electrodes inserted in the electrode holders will be substantially parallel to one another and to the tube 10 supported in the bushing 9. A chamber 12 is formed in the cement 11 and the electrode holders 7 and 8 and the tube 10 extend into this chamber. The arrangement of the electrode holders is such that electrodes inserted therein extend through this chamber and beyond the head of the torch a slight distance, where the terminals of the electrodes approach within arcing distance of one another. The tube 10 extends to the tip of the torch terminating near the arcing terminal of the electrodes. This tube is of small bore and preferably of quartz formed with a tapered end portion 13 adapted to fit in a correspondingly tapered portion of the bushing 9. The tube 10 is held in place in the bushing 9 by means of a hollow collar 14 and a set screw 15. By removing the set screw 15 and the collar 14, the tube 10 may be removed from the torch and renewed in case of breakage.

Gas is supplied to the upper portion of the chamber 12 through a tube 16 and to the interior of the bushing 9 through a tube 17. Tubes 16 and 17 are connected through a valve block 18 and a valve 19 to the conduit 4 through which gas is supplied to the torch. The valve block 18 is provided with two valves 20 and 21 by means of which the relative gas pressures in the pipes 16 and 17 are controlled. The valve 20 controlling the supply of gas through the tube 16 to the upper portion of the chamber 12 is sufficiently closed, so that gas under slight pressure is admitted into the upper portion of this chamber. Valve 21 which controls the supply of gas through tube 17, bushing 9 and tube 10 is opened to a greater extent so that high pressure gas is discharged through the small bore tube 10 and across the arcing terminals of the electrodes 22 and 23.

Electrodes 22 and 23 are clamped in the holders 7 and 8 by means of nuts 24 and 25. Current is supplied to these electrodes through conductors 26 and 27 attached to the holders 7 and 8. Either direct or alternating current, single or multiphase, may be used. These conductors are threaded through a porcelain bushing 28 which, together with the tubes 16 and 17, valve 19 and valve block 18, are enclosed within the stock 1 of the torch. Conductors 26 and 27 are connected with or are a continuation of the conductors 5 illustrated in Fig. 1. As shown in Fig. 2, the refractory insulating cement 11 is forced into the right-hand portion of the stock 1 and serves as a support for the ends of tubes 16 and 17 and the end of the porcelain bushing 28.

The method of operating the torch is as follows: Electrodes 22 and 23 are adjusted in holders 7 and 8 so that their terminals approach within arcing distance of one another. Gas, for example hydrogen, is then supplied to the chamber 12 and to the capillary tube 10 by opening the valve 19. An arc is then struck between the electrodes by completing a circuit therethrough through the agency of some conductor, and the torch then operates to generate atomic hydrogen which may be used for any desired metallurgical operation.

A bathing atmosphere is provided about the electrodes and the arc by the gas supplied through tube 16 into the upper portion of chamber 12. Atomic gas is blown out from between the electrodes by means of the high velocity gas jet issuing from the capillary tube 10. In the particular torch illustrated in the drawing the outside diameter of the quartz tube is about 1/8 of an inch and the inside diameter about 20 mils. The gas pressure in front of the quartz tube may vary from one-half to 65 pounds per square inch according to the size of the flame and the current in the arc. The pressure of the shielding gas issuing from chamber 12 is a small fraction of an ounce, probably one-hundredth of one-tenth of an ounce.

The size of the tube 10 and the pressure of the gas used may vary considerably with the size of the torch and the character of the work. The underlying idea is to produce a blast of high velocity and yet not consume an excessive amount of gas. If the opening in the inner tube were large, it would have to admit such a large amount of gas that the arc as well as the flame beyond it would be cooled considerably. Under such conditions it would be impossible to maintain the conditions which are quite essential to keep the hydrogen in the atomic state. With the arrangement illustrated and described, however, a comparatively small amount of gas is blown either through or near the arc. This small amount of molecular hydrogen determines a draft so that the atomic hydrogen diffusing from the arc core is drawn, concentrated and directed in a narrow stream away from the arc.

The parallel arrangement of the electrodes, although not essential to my invention, is preferred for it further facilitates the copious generation of atomic hydrogen. By arranging the electrodes in substantially parallel relation, as illustrated, the molten tips of the electrodes, at the terminals of the arc established therebetween are not cooled by the blast of hydrogen issuing from the capillary tube 10. This results in a more stable arc and the generation of a greater amount of atomic hydrogen than would result if the electrodes were located at a substantial angle to one another. The parallel arrangement of the electrodes in the compact structure made possible by this arrangement also greatly reduces the size of the head of the torch and renders it suitable for use in congested places where the amount of clearance is small. The parallel arrangement of welding electrodes in a gas-arc torch forms part of the subject matter of the application of Peter P. Alexander, Serial No. 477,542, for Atomic gas torch, filed concurrently herewith, and assigned to the same assignee as the present application.

Because of the long pointed flame produced by my improved torch, it is possible to perform welding operations in otherwise inaccessible places. I have been able with the torch illustrated and described to render incandescent a refractory brick at a distance of six and a half inches from the torch, and the concentrated stream of gas will give a flame extending from six to eight inches from the arc maintained between the terminals of the electrodes 22 and 23. The atomic flame generated by my torch is quite similar to the oxy-hydrogen flame in shape and stiffness, although much hotter than the same.

Because of the possibility of holding the torch at a considerable distance from the work the electrodes and torch will be kept far enough away from the pool of molten metal in the work so as not to become contaminated by metallic particles projected from the pool during welding. Furthermore, the torch can be held at a sufficient distance from the work so that the arc established between the electrodes does not come in contact therewith and become shorted during the welding operation.

Because of the small amount of hydrogen used and the confined and directive nature of the flame, my torch may be used by operators more comfortably than previous designs in which the atomic flame has not been so well confined and directed. The long pointed flame likewise renders the torch suitable for cutting operations. The flame both melts the metal to be cut and blows the molten metal from the kerf.

While I prefer to employ my torch for atomic hydrogen welding and cutting, it may be used with other gases than hydrogen and for performing other operations than welding and cutting. Mixtures of gases may be used instead of pure gases and the decomposition products of gases and liquids such as ammonia and methanol may be used.

While I have illustrated a torch provided with a handle for manual operations, it is apparent that the torch may be mounted in an automatic machine.

What I claim as new and desire to secure by Letters Patent of the United States, is:

1. A nozzle for a gas-arc torch comprising a hollow member, a plurality of electrode holders, refractory insulating cement for supporting said holders and for forming in said member a chamber into which electrodes supported by said holders project, and means for supplying gas to the upper portion of said chamber.

2. A gas-arc torch comprising means for holding a plurality of electrodes in adjusted relation relatively to one another, a chamber through which said electrodes extend, a conduit terminating in the upper part of said chamber for supplying gas thereto, and a second conduit extending through said chamber and arranged to direct a blast of gas between the arcing terminals of electrodes inserted in said holders.

3. A gas-arch torch comprising means for holding a plurality of electrodes in adjusted relation relatively to one another, a chamber through which said electrodes extend, a conduit terminating in the upper part of said chamber for supplying gas thereto, and means for producing across the arcing terminals of electrodes inserted in said holders a small jet of high velocity gas.

4. A gas-arc torch comprising means for holding a plurality of electrodes in adjusted relation relatively to one another, a plurality of electrical conductors, means for independently connecting one of said conductors to each of said holders, refractory electrical insulating means for supporting said electrode holders, a chamber in said refractory insulating means into which said electrode holders extend, a conduit extending into the upper portion of said chamber, and a second conduit extending through said chamber and terminating near the arcing terminals of electrodes supported in said holders.

5. A torch comprising a nozzle member, means in said member for holding a plurality of electrodes in adjusted relation relatively to one another, means for insulating said holding means from one another, a plurality of insulated electrical conductors, means for independently connecting one of said conductors to each of said holders, a capillary tube in said nozzle extending therethrough and terminating in proximity to the arcing terminals of electrodes inserted in said holders, means for supplying gas to said nozzle member, means for supplying gas to said capillary tube, and means for controlling the supply of gas to said nozzle and to said capillary tube.

6. A torch comprising a hollow terminal member, a plurality of electrode holders in said member for holding a plurality of electrodes in substantially parallel relationship with one another and with their arcing terminals extending beyond said member, a plurality of electrical conductors and pipes extending into said member, refractory insulating means for supporting said electrode holders and the terminal portions of said pipes and conductors, a chamber in said refractory insulating means into which said electrode holders, pipes and conductors extend, means for independently connecting one of said conductors to each of said electrode holders, a capillary tube in said chamber extending therethrough in substantially parallel relationship with said holders and terminating near the arcing terminals of electrodes inserted in said holders, and means for connecting said tube to the terminals of one of said pipes.

7. A gas-arc torch comprising a plurality of electrode holders, a plurality of electrical conductors, means for independently connecting one of said conductors to each of said electrode holders, a tube of refractory material, a bushing, means for detachably clamping said tube in said bushing, refractory insulating means for supporting said electrode holders and said bushing and for positioning thereby the discharge opening of said tube clamped in said bushing in proximity to the arcing terminals of electrodes inserted in said electrode holders, a chamber in said refractory insulating means into which said electrode holders and said bushing extend, a conduit extending into the upper portion of said chamber, and a second conduit terminating in said bushing.

In witness whereof, I have hereto set my hand this 22nd day of August, 1930.

BORIS VASLEY NAGASHEV.